Dec. 19, 1933.     A. L. ROSE     1,939,923
FRUIT PITTING MACHINE
Filed May 13, 1932
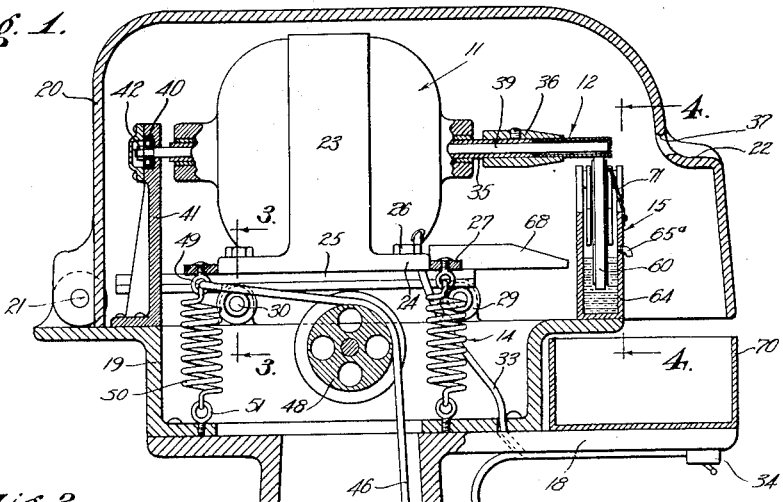
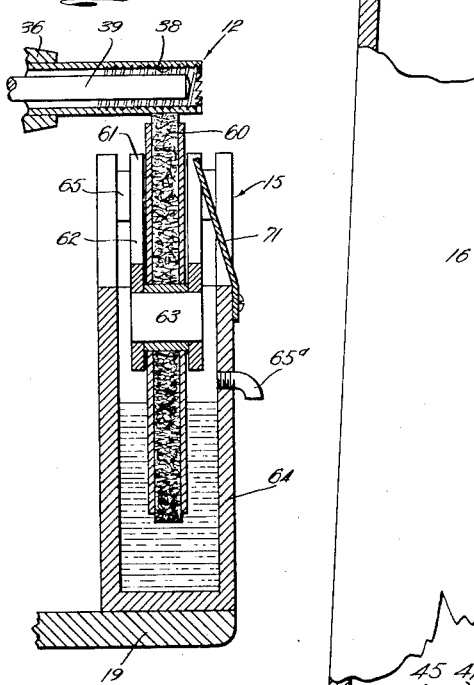
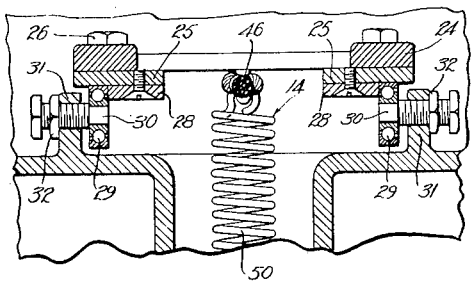
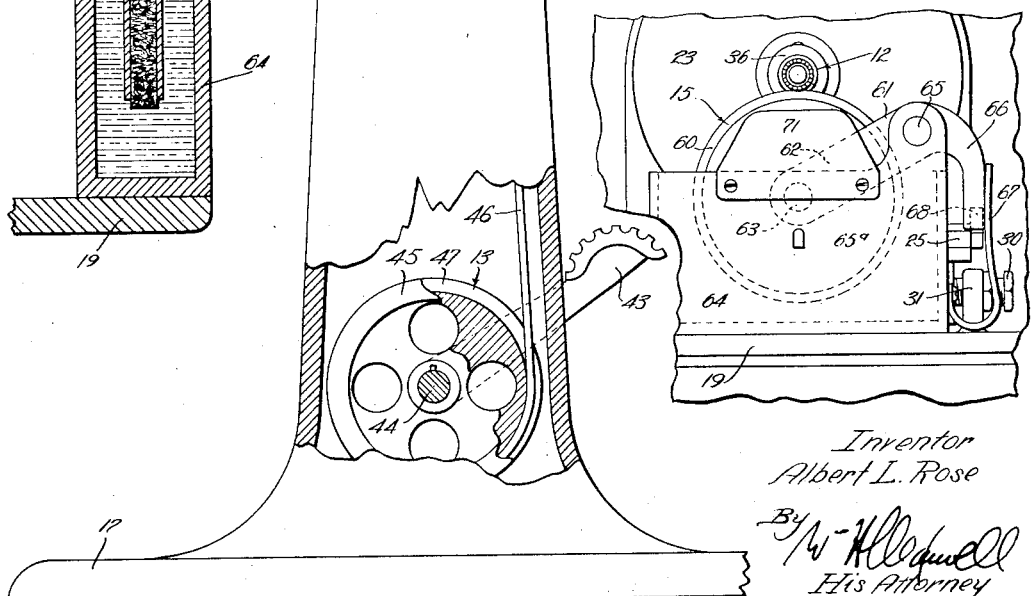
Inventor
Albert L. Rose
By
His Attorney Patented Dec. 19, 1933

1,939,923

UNITED STATES PATENT OFFICE 1,939,923

FRUIT PITTING MACHINE

Albert L. Rose, Palm Springs, Calif., assignor to Mae Tarter, Palm Springs, Calif.

Application May 13, 1932. Serial No. 611,093

15 Claims. (Cl. 146—17)

This invention relates to a device for removing the pits or kernels from fruit, and relates more particularly to a machine for pitting or removing the pits from dates.

Machines and devices of various characters have been introduced to pit or remove the pits or kernels from fruit. The pits of dates are inclosed or held in place in the date by a fibrous structure commonly called the "rag." This "rag" or fibrous content of the date is very undesirable and it is advantageous to remove it together with the pit. The forms of fruit pitters or date pitting machines in general use do not remove the "rag" or fibrous portion of the date, but are only operable to remove the pit.

It is a general object of the present invention to provide a simple, practical and efficient fruit pitting machine that is particularly adapted to pit dates and that is operable to remove both the pit and the entire "rag" or undesirable fibrous content of the date.

It is another object of the invention to provide a machine for pitting dates that operates to tightly wrap or twist the fibrous content of the date on to the pit as the pit is withdrawn so that all of the undesirable fibrous content is removed together with the pit in one operation without tearing or otherwise distorting the date.

It is another object of the invention to provide a date pitting machine of the character mentioned that is simple and convenient to control and operate.

It is another object of the invention to provide a date pitting machine in which the cutter barrel or tubular cutter is automatically washed and cleaned after each operation.

It is another object of the invention to provide a date pitting machine that is clean and sanitary and that is particularly attractive in appearance.

It is another object of the invention to provide a fruit pitting machine of the character mentioned that embodies a novel and improved means for advancing and retracting the rotating tubular cutter.

It is a further object of the invention to provide an improved cutter or pitting element for use in fruit pitting machines that is particularly effective, and that is operable to remove the fibrous wrapping of the pit together with the pit.

Other objects and features of my invention will be best and more fully understood from the following detailed description of a typical form and application of the invention, throughout which description reference is had to the accompanying drawing, in which:

Fig. 1 is a side elevation of the machine provided by this invention showing the principal parts of the device in vertical cross section, and illustrating the parts in the normal or retracted positions. Fig. 2 is an enlarged vertical detailed sectional view of the tubular cutter and the means for washing or cleaning the cutter. Fig. 3 is an enlarged fragmentary vertical detailed sectional view taken as indicated by line 3—3 on Fig. 1. Fig. 4 is an enlarged fragmentary front elevation of the cutter washing and cleaning means, being a view taken substantially as indicated by line 4—4 on Fig. 1.

The fruit or date pitting machine provided by my invention includes, generally, a housing or body 10, a motor 11 mounted within the body for horizontal movement, a cutter or pit remover 12 rotated by and movable with the motor 11, means 13 for moving or advancing the motor 11 to bring the cutter 12 into contact with the date, means 14 for returning the motor 11 to its normal position and means 15 for automatically washing and cleaning the cutter 12 after each operation.

The housing or body 10 of the device may be varied considerably without departing from the broader aspects of the invention. In the particular embodiment of the invention disclosed in the drawing, the body 10 includes a hollow pedestal 16 having a base 17 and a top flange 18. The pedestal 16 is hollow and may be of round cross sectional configuration. An upper or top body section 19 is mounted on the upper flange 18 of the pedestal to carry the principal parts of the machine. A cover 20 is provided to inclose the motor 11 and the various other parts supported by the body section 19. The cover 20 is preferably of considerable vertical depth or height and is pivoted at its rear end to the body section 19 by a pivot or hinge pin 21. A seat or cradle 22 in the form of an upwardly facing shoulder is provided on the forward wall of the cover 20. The seat or cradle 22 is shaped to effectively support or carry the fruit to be pitted. The cover 20 overhangs or projects a considerable distance forwardly of the body section 19 for the purpose to be subsequently described. The pedestal 16 and the body section 19 may be enamelled or otherwise suitably finished, while the cover 20 may be of polished cast aluminum.

The motor 11 is provided to operate or rotate the cutter 12 and is supported on the body section 19 for horizontal movement. The motor 11 may be in the form of a typical electric motor including a case 23 having a base or mounting flanges 24. A track is attached to the under side of the flanges 24. The track includes spaced parallel plates or rails 25 attached to the motor flanges 24 by the screw 26. The rails project from the opposite ends of the flanges 24 and cross members 27 extend between them at the opposite ends of the flanges 24. Guides 28 extend along the inner edges of the rails or tracks 25. Each of the rails 25 is supported on two or more spaced rollers 29 which support the motor 11 for horizontal movement. The rollers 29 may be in the form of typical ball bearings mounted on trunnions 30 screw-threaded through lugs 31 projecting upwardly from the body section 19. Lock nuts 32 are provided on the trunnions 30 to adjust or set the rollers 29 in their proper positions. It will be noted that the threaded trunnions 30 provided with the lock nuts 32 may be easily adjusted to properly align the motor 11 for its horizontal movement. The guides 28 cooperate with the rollers 29 to prevent lateral movement of the motor 11. Flexible electrical conductors 33 may extend through the body 10 to carry the energizing current to the motor 11. The operation of the motor 11 may be controlled by a suitable controller or switch 34.

The cutter or pit remover 12 is a tubular member attached to the forward end of the motor shaft 35. The cutter 12 may be replaceably attached to the motor shaft by suitable chuck 36. In accordance with the invention, the cutter 12 is a tubular member projecting a substantial distance forwardly from the chuck 36. An opening 37 is provided in the cover 20 immediately above the cradle 22 to pass the cutter 12 when the motor 11 is shifted forwardly. The forward end of the tubular cutter 12 is toothed or serrated as illustrated in Fig. 2 of the drawings to effectively cut through the date or fruit held on the cradle 22. It is an important feature of the present invention that the opening in the tubular cutter 12 is rifled or provided with a spiralled or helical groove 38 giving the interior of the cutter a thread-like surface. The rifling or groove 38 causes the fibrous "rag" of the date to be tightly wrapped on to the pit to remain in the outer end part of the cutter when the date is removed or when the cutter is withdrawn from the date during retraction of the cutter so that the "rag" is completely removed from the date together with the pit.

The motor shaft 35 is hollow or tubular, and a pit ejector rod 39 extends through it. The ejector rod 39 extends completely through the motor shaft 35 and projects a substantial distance from its forward end to extend to approximately the outer end of the cutter 12 when the motor and cutter are in their normal or retracted positions illustrated in Fig. 1 of the drawing. It is preferred to proportion and assemble the parts so that the ejector rod 39 is free to remain stationary or free to rotate with the motor shaft 35 at will. The projecting rear end of the ejector rod 39 is supported by a bearing 40 carried by a stationary bracket 41. The rod 39 is held against longitudinal movement by a nut 42 threaded on its inner end. The ejector rod 39 may be packed about or fitted in the shaft 35 and lubricated so that there is a pressure tight fit between the rod and shaft. When the date is removed from the cutter 12 or the cutter is withdrawn from the date a reduced pressure is created in the cutter which aids the rifling of the cutter in retaining the "rag" and pit in the outer end part of the cutter. It will be apparent how the ejector rod 39 causes the pit and the fibre around the pit to be ejected from the tubular cutter 12 upon retraction of the motor and cutter. It is to be noted that the ejector rod 39 aids in supporting and guiding the shiftable electric motor 11.

The means for moving or shifting the motor 11 to advance the cutter 12 through the opening 37 to act on the date, is in the nature of a manual means. The means 13 includes a foot pedal 43 disposed at a side of the pedestal 16 and attached to a horizontal shaft 44 extending into the pedestal. It is preferred to arrange the pedal 43 at the right side of the pedestal 16 so that it is more readily operated. A wheel or pulley 45 is fixed on the shaft 44 within the hollow pedestal 16. A flexible line 46 in the form of a chain, cable or rope is attached to the pulley 45 and operates in a peripheral groove 47 in the pulley. The line 46 extends upwardly from the pulley 45 and operates over a pulley 48 mounted in the body section 19. The upper end of the line 46 is tied or attached to an eye 49 projecting from the inner cross member 27. Upon the pedal being depressed, the motor 11 is shifted forwardly so that the cutter 12 passes through the opening 37 to act on the date held in the cradle 22 by the operator.

The means 14 for returning the motor 11 to its normal position is in the nature of a spring means, including spiral springs 50. The springs 50 have their upper ends attached to eyes 49 on the cross members 27 and their lower ends attached to eyes 51 on the lower wall of the body section 19. The springs 50 are normally under tension so that they effectively hold the motor 11 stable and cause the tracks 25 to pressurely engage the rollers 29. When the motor 11 is shifted forwardly by depressing the pedal 43 the springs 50 are stretched or elongated, and upon relieving or lessening the pressure on the pedal 43, the springs 50 automatically return the motor to its normal retracted position.

The means 15 for automatically washing or cleaning the cutter 12 includes a hard felt wheel 60 rotatably carried on an arm of a lever 61. The axis of rotation of the wheel 60 is below and parallel to that of the cutter 12. The arm 62 of the lever 61 is yoked, and the wheel 60 is rotatable on a pin 63 on the yoked arm. The lever 61 is pivotted at the upper edge of a container 64 by a pivot pin 65. The container 64 is adapted to carry water and the felt wheel 60 is movable vertically in the container. The lower end portion of the wheel 60 is at all times submerged in the water in the container 64. An overflow 65ª is provided for the container 64. A shield 71 extends over the forward upper end of the container 64 to prevent the falling pits and "rags" from passing into the container 64. The outer arm 66 of the lever 61 projects downwardly from the pivotal axis of the lever. A spring 67 engages the arm 66 to yieldingly urge the wheel 60 into engagement with the cutter 12.

The invention includes means for automatically disengaging the wheel 60 from the cutter 12 during advancement or forward movement of the cutter. A cam 68 projects forwardly from the track of the motor 11 and is adapted to engage the lower end of the lever arm 66 when the motor 11 is shifted forwardly. Cooperation between the cam 68 and the lever arm 66 pivots the lever 61 to move the periphery of the felt wheel 60 out of engagement with the cutter 12. When the pedal 43 is released and the motor 11 is returned to its normal position, the cam 68 moves out of engagement with the lever arm 66 so that the spring 67 returns the wheel 60 to a position in engagement with the cutter 12. It will be apparent how the felt wheel 60 is rotated through engagement with the cutter 12 and carries water from the receptacle 64 to effectively flush and wash the cutter. A removable receptacle 70 is mounted below the container 64 and opening 37 to receive the overflow from the container and catch the pits ejected from the cutter 12. The receptacle 70 is supported on the flange 18. The forward portion of the cover 20 extends over the receptacle 70 to cover its upper end.

It is believed that the operation of the machine provided by our present invention will be readily apparent from the foregoing detailed description. The motor 11 may continuously rotate the cutter 12 and may be controlled by means of the switch 34. The operator is adapted to hold the date or other fruit on the cradle 22 in a position where the cutter 12 will pass centrally into it to engage around the pit. In practice, the operator may wear leather gloves or finger tips when holding the fruit. The pedal 43 may be depressed to cause advancement of the motor 11 and passage of the cutter 12 through the opening 37 to cut into the fruit. The rotating tubular cutter 12 effectively cuts into the date around the pit without tearing or distorting the date. The movement of the cutter 12 into the date may be effectively controlled by means of the pedal 43. After the cutter 12 has passed into the date or fruit and before it has been retracted, the operator may remove the date from the cutter to assure himself that the pit has been properly removed. When the date is thus removed, the extracted pit may be seen in the outer end of the cutter. The rifling and the reduced pressure in the cutter retain the pit in the outer end part of the cutter until the cutter is extracted. To retract the cutter 12 and remove the pit and the fibrous structure around the pit, the pressure is removed from the pedal 43 so that the springs 50 retract the motor 11 and the cutter 12. The rifling or spiral groove 38 in the cutter 12 causes the "rag" or fibrous content of the date to be tightly twisted on to the pit so that it is removed from the date upon removal of the date from the cutter or upon retraction of the cutter 12 from the date. The ejector rod 39 ejects the pit and "rag" from the cutter 12 upon the cutter approaching the end of its inward movement. The "rag" and pit drop into the receptacle 70. The felt washing wheel 60 may be in contact with the cutter 12 at all times except the period of operation when the cutter 12 is advanced.

The present invention provides a fruit pitting machine that is simple and inexpensive of manufacture and that is particularly effective and inexpensive. The device removes both the pit and the fibrous structure around the pit in one operation without destroying the fruit and without waste. The operation of the machine is easily controlled so that there is little or no danger of injury to the operator.

Having described only a typically preferred form of my invention, I do not wish to limit myself to the specific details set forth, but wish to reserve to myself any changes or variations that may appear to those skilled in the art or fall within the scope of the following claims:

Having described my invention, I claim:

1. A fruit pitting machine of the character described including, a body having a cradle for supporting the fruit, a motor having a tubular shaft, means supporting the motor on the body for movement toward and away from the cradle, a tubular cutter on an end of the shaft adapted to cut into the fruit on the cradle, means for moving the motor, and a relatively stationary ejector rod extending through the motor shaft to project into the cutter to eject the pit from the cutter after the cutter is retracted from the fruit.

2. A fruit pitting machine of the character described including, a body having a cradle for supporting the fruit, a motor having a tubular shaft, means supporting the motor on the body for movement toward and away from the cradle, a tubular cutter on one end of the shaft adapted to cut into the fruit on the cradle, means for moving the motor, and a relatively stationary ejector rod extending into the other end of the motor shaft to project into the cutter after the cutter is retracted from the fruit to eject the pit from the cutter, the interior of the cutter being rifled to cause the fruit fibre to be twisted on the pit.

3. A fruit pitting machine including, a body having a cradle for supporting the fruit, a motor, means carrying the motor for horizontal movement toward and away from the cradle, a tubular pitting cutter rotated by and movable with the motor, means for moving the motor to feed the cutter into and out of the fruit, and means for ejecting the pit from the cutter during the retraction of the cutter, said means including a tubular shaft extending through the motor and carrying the cutter, and a relatively stationary rod extending through said shaft to project into the cutter.

4. A fruit pitting machine including, a body having a cradle for supporting the fruit, a movable motor, means supporting the motor on the body for movement toward and away from the cradle, a tubular pitting cutter rotated by and movable with the motor, means for moving the motor to feed the cutter into and out of the fruit, and means for washing the cutter during retraction of the cutter, the last mentioned means including a container on the body for holding a cleaning liquid, and an absorbent element partially immersed in the liquid and adapted to engage the cutter.

5. In a fruit pitting machine, a body having a cradle adapted to support the fruit, a rotating longitudinally movable tubular drive shaft carried by the body, a tubular pitting cutter on an end of the shaft, and means for moving the shaft longitudinally to feed the cutter into and out of the fruit, the interior of the fruit engaging end portion of the cutter being rifled to twist the fruit fibre onto the pit.

6. A fruit pitting machine including, a body having a cradle for supporting the fruit, a movable motor, a track on the body carrying the motor for movement toward and away from the cradle, a tubular pitting cutter rotated by and movable with the motor, manual means for moving the motor toward the cradle to feed the cutter into the fruit, means for automatically moving the motor away from the cradle to retract the cutter from the fruit, and means for ejecting the pit from the cutter upon its retraction.

7. A fruit pitting machine including, a body having a cradle for supporting the fruit, a motor, means supporting the motor on the body for movement toward and away from the cradle, a tubular pitting cutter rotated by and movable with the motor, means for moving the motor to feed the cutter into and out of the fruit, means for removing the pits from the cutter upon its retraction, and means for washing the cutter, the last mentioned means including a cleaning element, means for urging the element into engagement with the cutter, and means automatically disengaging the element from the cutter during advancement of the cutter into the fruit.

8. A fruit pitting machine including a body having a cradle for supporting the fruit, a motor having a rotating shaft, means supporting the motor on the body for movement toward and away from the cradle, a pitting cutter on one end of the shaft, manual means for advancing the motor to feed the cutter into the fruit, means for returning the motor, a wheel for washing the cutter, and means disengaging the wheel from the cutter during feeding of the cutter.

9. A fruit pitting machine including a body having a cradle for supporting the fruit, a motor having a rotating shaft, a track supporting the motor for horizontal movement toward and away from the cradle, a pitting cutter on one end of the shaft, manual means for advancing the motor to feed the cutter into the fruit, including a pedal, and a line connecting the pedal and motor.

10. A fruit pitting machine including a body, a cover on the body having a shoulder adapted to support the fruit to be pitted, there being an opening in the cover adjacent the shoulder, a motor mounted on the body under the cover and housed thereby and mounted for movement toward and away from the said opening, a cutter carried by the motor in alignment with the opening and connected therewith to be rotated by and movable with the motor and adapted to project through said opening to cut into the fruit, and means for moving the motor to project the cutter through the opening.

11. A fruit pitting machine including, a body having a cradle adapted to support the fruit, a motor, a substantially horizontal track on the body, the motor resting on the track for movement toward and away from the cradle, a cutter carried by the motor and related to the motor to be rotated by and movable with the motor toward the cradle for cutting into the fruit on the cradle, means for moving the motor toward the cradle, and yielding means normally holding the motor on the track and normally tending to move the motor to position where the cutter is retracted.

12. A fruit pitting machine including, a body having a cradle adapted to support the fruit, a motor, a substantially horizontal track on the body, the motor resting on the track for movement toward and away from the cradle, a cutter carried by the motor and related to the motor to be rotated by and movable with the motor for cutting into the fruit on the cradle, means for moving the motor toward the cradle, and a spring connected to the motor and a fixed part of the body for holding the motor on the track and operable to automatically move the motor away from the cradle.

13. A fruit pitting machine including, a body comprising a hollow pedestal, a head on the upper end of the pedestal having a cradle adapted to support the fruit, a motor, means supporting the motor on the head for movement toward and away from the cradle, a cutter movable with and rotated by the motor and operable to cut into the fruit on the cradle, a pulley in the pedestal, an operating pedal in connection with the pulley and projecting from the pedestal, and a flexible element operable on the pulley and connected with the motor whereby the depression of the pedal advances the motor toward the cradle.

14. In a fruit pitting machine, two elements, one a support for the fruit, the other a rotating tubular pitting cutter, and means for moving one element relative to the other to bring the cutter and fruit into cooperation, the interior of the cutter being rifled to form a thread-like surface to twist the fibre of the fruit onto the pit.

15. In a fruit pitting machine, a rotating tubular cutter having teeth projecting from one end and the interior of the cutter adjacent said end being rifled to form a thread-like surface to twist the fruit fibre onto the pit.

ALBERT L. ROSE.